United States Patent
Tseng et al.

(10) Patent No.: US 9,268,167 B2
(45) Date of Patent: Feb. 23, 2016

(54) LIQUID CRYSTAL DISPLAY PANEL

(71) Applicant: Au Optronics Corporation, Hsinchu (TW)

(72) Inventors: Wen-Hsien Tseng, Taichung (TW); Yen-Heng Huang, New Taipei (TW); Chia-Hui Pai, Taichung (TW); Chung-Kai Chen, Taichung (TW); Wei-Yuan Cheng, Taichung (TW); Yi-Jen Huang, Kaohsiung (TW); Chun-Jen Chiu, Taichung (TW); Yu-Zhi Wu, Nantou County (TW); Yuan-Nan Chiu, Yunlin County (TW)

(73) Assignee: Au Optronics Corporation, Hsinchu (TW)

( * ) Notice: Subject to any disclaimer, the term of this patent is extended or adjusted under 35 U.S.C. 154(b) by 218 days.

(21) Appl. No.: 14/080,814

(22) Filed: Nov. 15, 2013

(65) Prior Publication Data

US 2014/0071385 A1 Mar. 13, 2014

Related U.S. Application Data

(62) Division of application No. 12/949,791, filed on Nov. 19, 2010, now abandoned.

(30) Foreign Application Priority Data

Jun. 14, 2010 (TW) ................ 99119300 A

(51) Int. Cl.
*G02F 1/1339* (2006.01)
*G02F 1/1335* (2006.01)
*G02F 1/1341* (2006.01)
*G02F 1/1333* (2006.01)

(52) U.S. Cl.
CPC ........ *G02F 1/133514* (2013.01); *G02F 1/1341* (2013.01); *G02F 1/133512* (2013.01); *G02F 2001/133388* (2013.01)

(58) Field of Classification Search
CPC ............... G02F 1/133512; G02F 1/133514; G02F 1/1341; G02F 2001/133388
USPC .............. 349/106, 153, 154; 345/88
See application file for complete search history.

(56) References Cited

U.S. PATENT DOCUMENTS

| 6,778,232 B2 * | 8/2004 | Nakata et al. ............ 349/43 |
| 2002/0093027 A1 * | 7/2002 | Zhong et al. ............ 257/98 |
| 2004/0017538 A1 * | 1/2004 | Yun et al. .............. 349/187 |
| 2004/0114081 A1 * | 6/2004 | Sawasaki et al. ........ 349/123 |

* cited by examiner

*Primary Examiner* — Hoan C Nguyen
(74) *Attorney, Agent, or Firm* — Jianq Chyun IP Office

(57) ABSTRACT

A liquid crystal display (LCD) panel includes an active device array substrate, an opposite substrate, a sealant, a liquid crystal layer, a black matrix, and a plurality of rough structures. The active device array substrate has a display area and a peripheral area surrounding the display area, and the liquid crystal layer and the peripheral area are surrounded by the sealant. The black matrix is disposed between the active device array substrate and the opposite substrate and distributed corresponding to the display area and the peripheral area. The rough structures are disposed on a portion of the black matrix and distributed corresponding to the peripheral area. Surface roughness of the rough structures is greater than surface roughness of the black matrix distributed corresponding to the display area.

11 Claims, 12 Drawing Sheets

LIQUID CRYSTAL DISPLAY PANEL

CROSS-REFERENCE TO RELATED APPLICATION

This application is a divisional of and claims the priority benefit of U.S. patent application Ser. No. 12/949,791, filed on Nov. 19, 2010, now pending, which claims the priority benefit of Taiwan application serial no. 99119300, filed on Jun. 14, 2010. The entirety of each of the above-mentioned patent applications is hereby incorporated by reference herein and made a part of specification.

BACKGROUND OF THE INVENTION

1. Field of the invention

The invention relates in general to a display panel and in particular to a liquid crystal display (LCD) panel.

2. Description of Related Art

The conventional LCD panel is formed by a color filter substrate, a thin film transistor (TFT) array substrate, and a liquid crystal layer sandwiched therebetween. Recently, techniques of directly forming color filter on array (COA) and forming black matrix on array (BOA) have been proposed. Specifically, a COA substrate or a BOA substrate is assembled to an opposite substrate, and liquid crystal molecules are then trapped between the two substrates to constitute an LCD panel.

In general, the liquid crystal molecules can be introduced between the two substrates by way of vacuum suction or one drop fill (ODF). Since the dimension of the LCD panel increases, it is rather time-consuming to introduce the liquid crystal molecules between the two substrates by vacuum suction. Hence, in an assembly process of a large-size LCD panel, the liquid crystal molecules are introduced between the two substrates by way of ODF in most cases. In particular, prior to the ODF, a sealant is formed at boundaries of a display area of an active device array substrate, so as to define liquid crystal accommodation space. The amount of the dropped liquid crystal molecules is determined based on the dimension of the liquid crystal accommodation space and a cell gap between the two substrates, such that the liquid crystal molecules with certain volume are dropped into the liquid crystal accommodation space. The active device array substrate and the color filter substrate are then aligned and assembled, and the sealant is cured to trap the liquid crystal molecules between the two substrates.

Nevertheless, when the liquid crystal molecules are introduced between the two substrates by way of ODF, the liquid crystal molecules are diffused to the periphery of the sealant in a capillary manner. In the LCD panel having the COA substrate or the BOA substrate, vias between pixel electrodes and drain electrodes of active devices cannot be fully filled with the liquid crystal molecules when the liquid crystal molecules are diffused to the periphery of the sealant due to the insufficient capillary force. Thereby, vacuum bubbles are apt to be generated in the vias. The vacuum bubbles result in reduced yield of the LCD panel. Besides, the vacuum bubbles are located corresponding to the drain electrodes and the vias, and therefore the vacuum bubbles are not prone to be observed by naked eyes or image recognition systems. Accordingly, test balls have been developed to knock edge regions of the LCD (the periphery of the sealant), so as to further determine whether a bubble issue exists. However, even though the bubble issue can be detected by using the test balls, it is not likely to resolve the bubble issue effectively.

SUMMARY OF THE INVENTION

The invention is directed to an LCD panel capable of reducing air bubbles formed when a liquid crystal layer is formed in the display panel.

The invention provides an LCD panel including an active device array substrate, an opposite substrate, a sealant, a liquid crystal layer, a black matrix, a plurality of first protrusions, and a plurality of second protrusions. The opposite substrate is disposed above the active device array substrate. The sealant is disposed between the active device array substrate and the opposite substrate. Here, the active device array substrate has a display area and a peripheral area surrounding the display area, and the sealant surrounds the peripheral area. The liquid crystal layer is disposed between the active device array substrate and the opposite substrate and surrounded by the sealant. The black matrix is disposed between the active device array substrate and the opposite substrate and distributed corresponding to the display area and the peripheral area. The first protrusions are disposed between the active device array substrate and the opposite substrate and distributed corresponding to the display area. The second protrusions are disposed between the active device array substrate and the opposite substrate and distributed corresponding to the peripheral area. Here, distribution density of the first protrusions is less than distribution density of the second protrusions.

The invention provides an LCD panel including an active device array substrate, an opposite substrate, a sealant, a liquid crystal layer, a plurality of first black matrices separated from one another, a second black matrix, a plurality of first protrusions, and a plurality of second protrusions. The opposite substrate is disposed above the active device array substrate. The sealant is disposed between the active device array substrate and the opposite substrate. Here, the active device array substrate has a display area and a peripheral area surrounding the display area, and the sealant surrounds the peripheral area. The liquid crystal layer is disposed between the active device array substrate and the opposite substrate and surrounded by the sealant. The first black matrices separated from one another are disposed between the active device array substrate and the opposite substrate and distributed corresponding to the display area. The second black matrix is disposed between the active device array substrate and the opposite substrate and distributed corresponding to the peripheral area. Here, the second black matrix surrounds the first black matrices. Each of the first protrusions is disposed on one of the first black matrices. The second protrusions are disposed on the second black matrix.

The invention provides an LCD panel including an active device array substrate, an opposite substrate, a sealant, a liquid crystal layer, a black matrix, and a plurality of rough structures. The opposite substrate is disposed above the active device array substrate. The sealant is disposed between the active device array substrate and the opposite substrate. Here, the active device array substrate has a display area and a peripheral area surrounding the display area, and the sealant surrounds the peripheral area. The liquid crystal layer is disposed between the active device array substrate and the opposite substrate and surrounded by the sealant. The black matrix is disposed between the active device array substrate and the opposite substrate and distributed corresponding to the display area and the peripheral area. The rough structures are disposed on a portion of the black matrix and distributed corresponding to the peripheral area. Surface roughness of the rough structures is greater than surface roughness of the black matrix distributed corresponding to the display area.

Based on the above, the black matrix corresponding to the peripheral area of the LCD panel includes the protrusions or the rough structures as described in the embodiments of the invention, so as to reduce the air bubbles generated when the liquid crystal layer is formed in the display panel.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
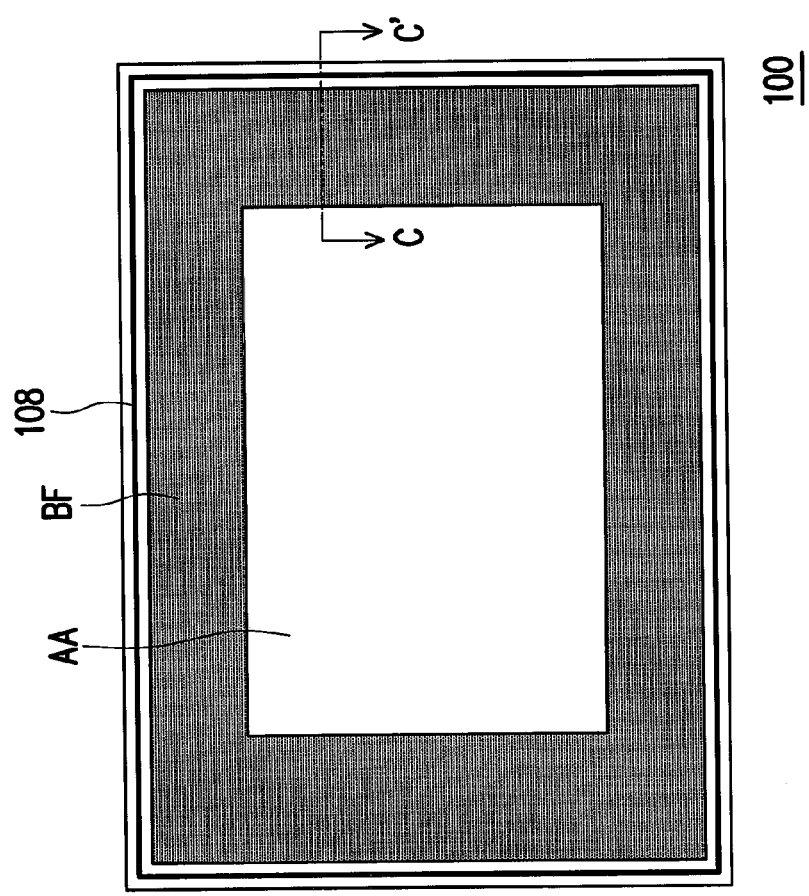
FIG. 1 is a schematic top view illustrating an LCD panel according to an embodiment of the invention.
Figure 2:
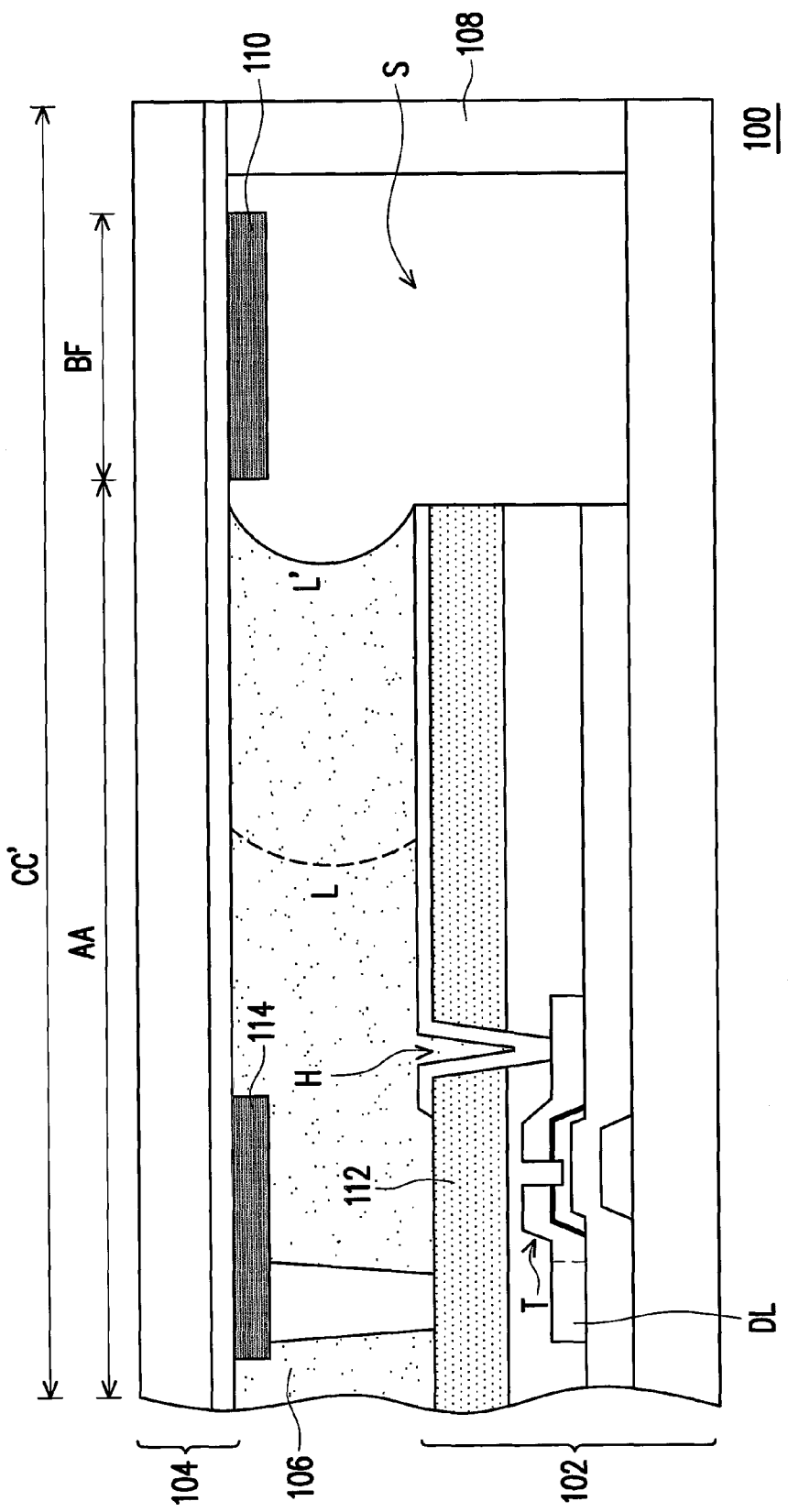
FIG. 2 is a schematic cross-sectional view taken along a cross-section C-C' depicted in FIG. 1.

FIG. 1 is a schematic top view illustrating an LCD panel according to an embodiment of the invention. FIG. 2 is a schematic cross-sectional view taken along a cross-section C-C' depicted in FIG. 1. With reference to FIG. 1 and FIG. 2, an LCD panel 100 of this embodiment includes an active device array substrate 102, an opposite substrate 104, a liquid crystal layer 106, a sealant 108, and a black matrix 110. The opposite substrate 104 is disposed above the active device array substrate 102. The sealant 108 is disposed between the active device array substrate 102 and the opposite substrate 104. Here, the active device array substrate 102 has a display area AA and a peripheral area BF surrounding the display area AA, and the sealant 108 surrounds the peripheral area BF. The liquid crystal layer 106 is disposed between the active device array substrate 102 and the opposite substrate 104 and surrounded by the sealant 108. The black matrix 110 is disposed between the active device array substrate 102 and the opposite substrate 104 and distributed corresponding to the peripheral area BF.

In this embodiment, the active device array substrate 102 includes a plurality of active devices T and a color filter layer 112. The color filter layer 112 is placed on the active device array to form the COA substrate. The active device array substrate 102 can be any kind of COA substrate, and the invention poses no limitation to the type of the active device array substrate 102. On the other hand, a black matrix 114 of this embodiment is formed on the opposite substrate 104, and the black matrix 114 and the black matrix 110 are located on the same side of the opposite substrate 104.

In other embodiments of the invention, the black matrix 114 can also be placed on the active device array to form the COA substrate and the BOA substrate. Namely, the black matrix 114 and the black matrix 110 can be formed on different sides, and the invention poses no limitation to the location of the black matrix 114.

When the liquid crystal layer 106 is formed by way of ODF, liquid crystal molecules are diffused to the periphery of the sealant 108 by means of capillary action, and the capillary force ΔP can be represented by the following equation:

$$\Delta P = \gamma_{la}\left(\cos\theta_c \frac{dA_{sl}}{dV_l} - \frac{dA_{la}}{dV_l}\right)$$

Here, the parameter $dA_{sl}$ refers to changes in the contact area between the diffusing liquid crystal molecules and the solid components (i.e. the active device array substrate 102 and the opposite substrate 104). The parameter $dA_{la}$ refers to changes in the contact area between the diffusing liquid crystal molecules and accommodation space S excluding the contact area between the diffusing liquid crystal molecules and the solid components.

Accordingly, in the process of diffusion, the capillary force alters together with different locations of the liquid crystal molecules. For instance, when the liquid crystal molecules are diffused from the location L to the location L', the parameter $dA_{sl}$ basically remains unchanged. However, when the liquid crystal molecules are diffused to the peripheral area BF, the parameter $dA_{sl}$ drastically increases, such that the capillary force ΔP decreases. The parameter $dA_{sl}$ drastically increases mainly because a gap between the opposite substrate 104 and the COA substrate or the BOA substrate in the peripheral area BF is relatively large. Therefore, with the insufficient capillary force ΔP, the vias H and the accommodation space S corresponding to the peripheral area BF cannot be fully filled with liquid crystal molecules, and thereby vacuum bubbles are prone to be generated in the vias H.

Figure 3:
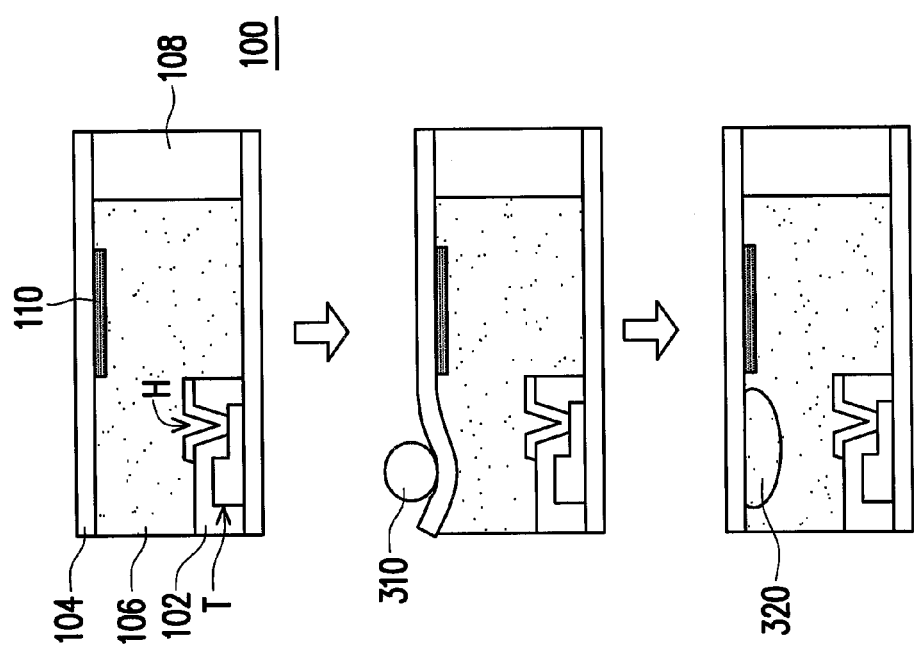
FIG. 3 is a schematic cross-sectional view illustrating the LCD panel that undergoes reliability test.

FIG. 3 is a schematic cross-sectional view illustrating the LCD panel that undergoes reliability test. As indicated in FIG. 3, when the test ball 310 falls, the bubbles 320 formed in the vias H are pushed out and can then be observed at edge regions of the LCD panel 100.

To lower the probability for generating the bubbles 320, the invention provides an LCD panel.

Figure 4:
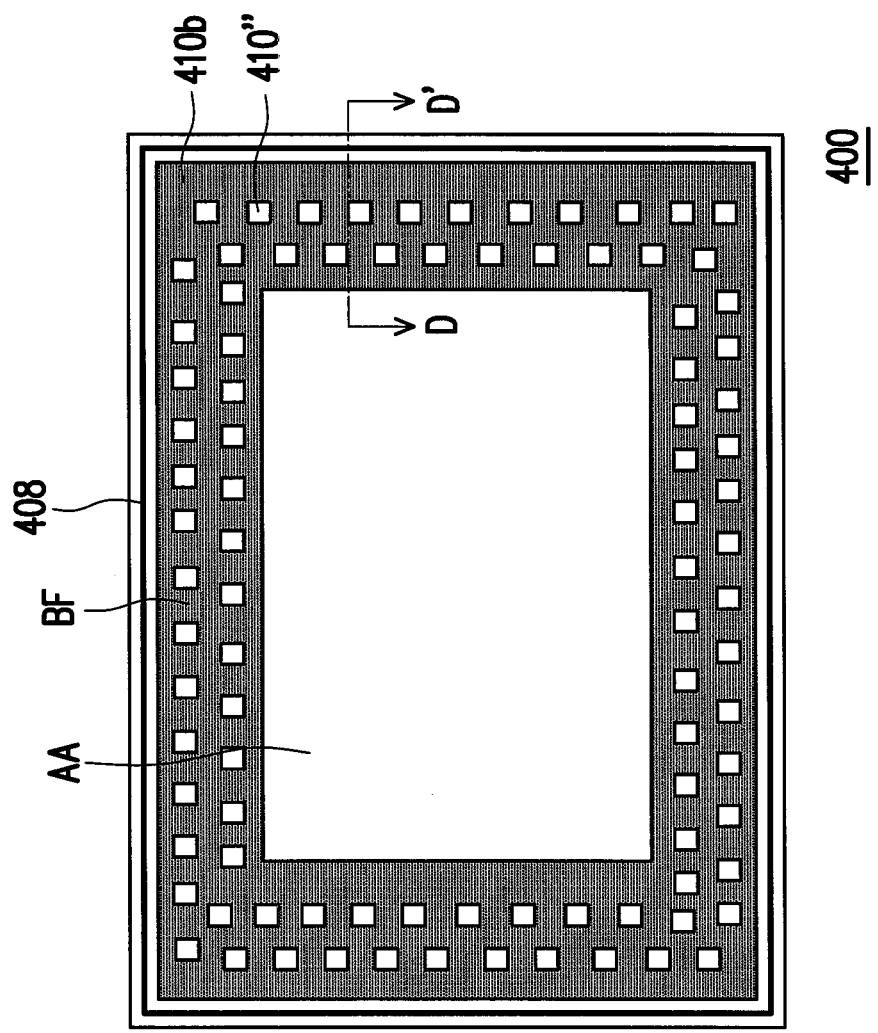
FIG. 4 is a schematic top view illustrating an LCD panel according to an embodiment of the invention.
Figure 5:
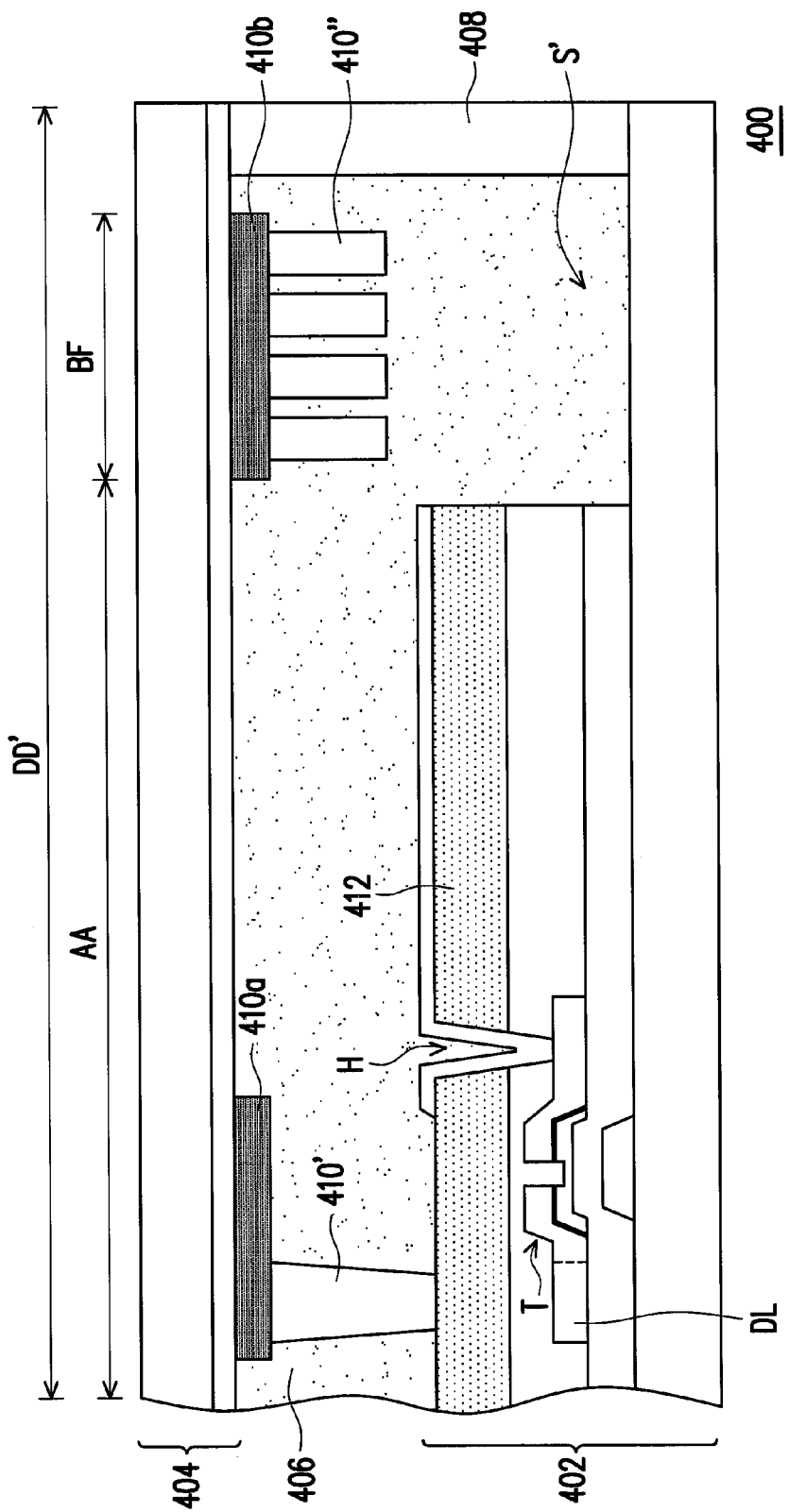
FIG. 5 is a schematic cross-sectional view taken along a cross-section D-D' depicted in FIG. 4.

FIG. 4 is a schematic top view illustrating an LCD panel according to an embodiment of the invention. FIG. 5 is a schematic cross-sectional view taken along a cross-section D-D' depicted in FIG. 4. With reference to FIG. 4 and FIG. 5, an LCD panel 400 of this embodiment includes an active device array substrate 402, an opposite substrate 404, a sealant 408, a liquid crystal layer 406, black matrices 410a and 410b, a plurality of first protrusions 410', and a plurality of second protrusions 410". In this embodiment, the black matrices 410a and 410b are disposed between the active device array substrate 402 and the opposite substrate 404 and respectively distributed corresponding to the display area AA and the peripheral area BF. The first protrusions 410' are disposed between the active device array substrate 402 and the opposite substrate 404 and distributed corresponding to the display area AA. The second protrusions 410" are disposed between the active device array substrate 402 and the opposite substrate 404 and distributed corresponding to the peripheral area BF.

In this embodiment, the active device array substrate 402 includes a plurality of active devices T and a color filter layer 412, i.e. the active device array substrate 402 is the COA substrate. According to other embodiments of the invention, the color filter layer can also be formed below the active device array to form an array on color filter (AOC) substrate.

On the other hand, the black matrices 410a of this embodiment are formed on the opposite substrate 404, and the black matrices 410a and 410b are located on the same side of the opposite substrate 404. In other embodiments of the invention, the black matrices 410a can also be formed on the active device array. Namely, the black matrices 410a and 410b can be formed on different sides, and the invention poses no limitation to the location of the black matrices 410a.

Besides, in this embodiment, the first protrusions 410', for instance, are photo spacers (PS) disposed between the active device array substrate 402 and the opposite substrate 404 and distributed corresponding to the display area AA. The second protrusions 410" are located on the black matrix 410b and distributed corresponding to the peripheral area BF. The second protrusions 410" protrude toward the active device array substrate 402, as indicated in FIG. 5.

Note that distribution density of the first protrusions 410' is less than distribution density of the second protrusions 410" according to this embodiment. Specifically, the first protrusions 410', e.g. the PS, are distributed corresponding to the display area AA, and the distribution density of the first protrusions 410' can be defined by dividing the number of the PS distributed corresponding to the display area AA by the measure of the display area AA. Similarly, the distribution density of the second protrusions 410" can be exemplarily defined by dividing the number of the second protrusions 410" distributed corresponding to the peripheral area BF by the measure of the peripheral area BF. Based on the definition of the distribution density as stated above, the distribution density of the first protrusions 410' is less than the distribution density of the second protrusions 410" in this embodiment.

Figure 6:
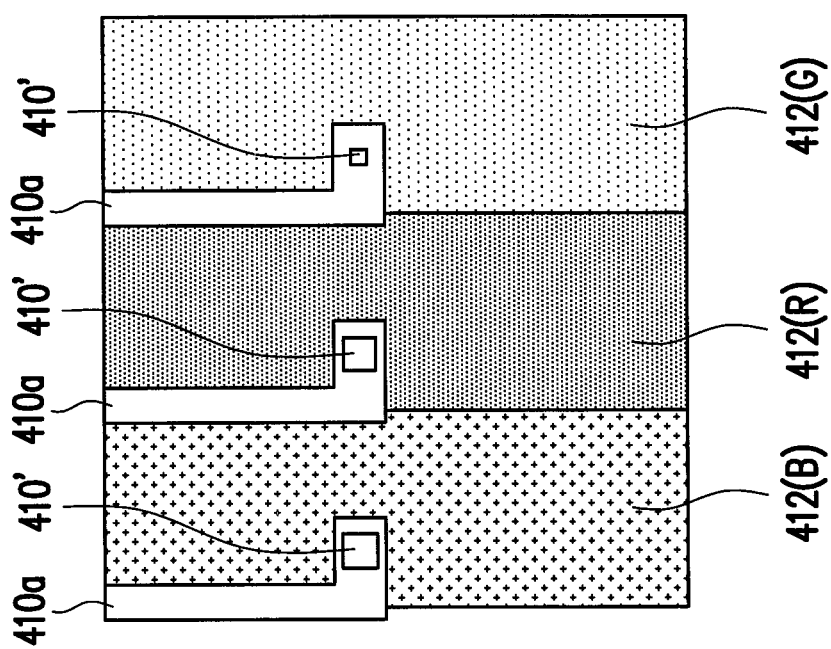
FIG. 6 illustrates one pixel unit in the display area AA depicted in FIG. 4.

From another aspect, please refer to FIG. 6 illustrating one pixel unit in the display area AA depicted in FIG. 4. With reference to FIG. 4~FIG. 6, in this embodiment, each pixel unit includes a red sub-pixel, a green sub-pixel, and a blue sub-pixel, for example. The corresponding color filter patterns 412(R), 412(G), and 412(B) are depicted in FIG. 6.

Note that the black matrices 410a distributed corresponding to the display area AA are separated from one another, and the black matrix 410b distributed corresponding to the peripheral area BF surrounds the black matrices 410a distributed corresponding to the display area AA. Specifically, in the display area AA, the black matrices 410a are distributed corresponding to the active devices, the scan lines, the data lines, and the storage capacitors, for instance. In this embodiment, the black matrix 410b shown in the drawings entirely surrounds the display area AA, which should not be construed as a limitation to this invention. Namely, the black matrix 410b can also be arranged in an island-like manner or in a block-like manner based on designers' demands.

In this embodiment, each of the black matrices 410a in the display area AA has one of the first protrusions 410' disposed thereon (i.e. the one-to-one configuration). That is to say, each of the first protrusions 410' is respectively disposed on one of the black matrices 410a. A plurality of second protrusions 410" are disposed on the black matrix 410b in the peripheral area BF (i.e. the one-to-many configuration). In other words, the black matrix 410b has a plurality of second protrusions 410" disposed thereon.

In this embodiment, the black matrix 410b in the peripheral area BF of the LCD panel 400 includes the second protrusions 410". Hence, when the liquid crystal molecules are diffused to the peripheral area BF, the parameter $dA_{la}$ is changed to a significant less extent, such that the peripheral area BF and the liquid crystal layer around the peripheral area BF can supply an enhanced capillary force $\Delta P$. Thereby, the bubbles formed when the liquid crystal layer is formed in the display panel 400 can be reduced, and the display quality can be improved.

On the other hand, the first protrusions 410' of this embodiment, for example, are PS, which should however not be construed as a limitation to this invention. In other embodiments, the first protrusions 410' can also be the same material of the black matrices 410a corresponding to the display area AA, for instance.

Figure 7:
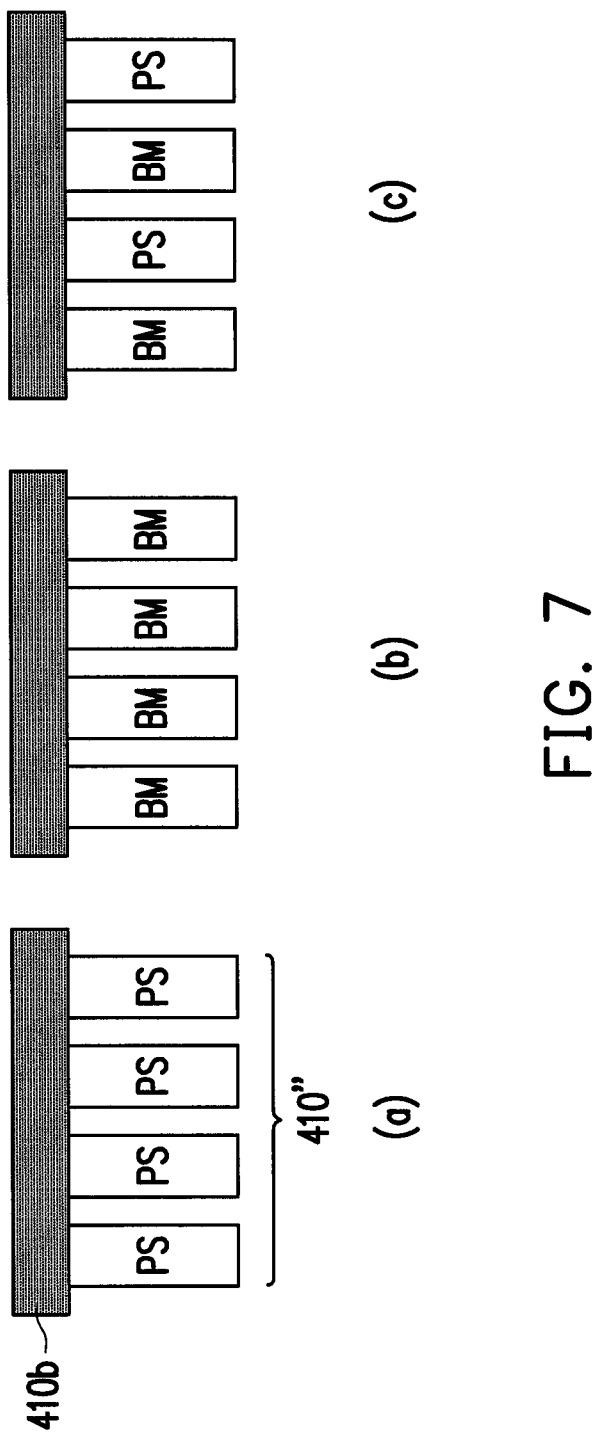
FIG. 7(a)~FIG. 7(c) illustrate the configuration of the black matrix distributed corresponding to the peripheral area depicted in FIG. 5 and the second protrusions made of different materials.

FIG. 7(a)~FIG. 7(c) illustrate the configuration of the black matrix 410b corresponding to the peripheral area depicted in FIG. 5 and the second protrusions 410" made of different materials. Please refer to FIG. 5 and FIG. 7(a)~FIG. 7(c). The second protrusions 410" depicted in FIG. 7(a) are made of substantially the same material as that of the first protrusions 410' depicted in FIG. 5. Namely, the material of the second protrusions 410" is substantially the same as the material of the PS. In FIG. 7(a), the second protrusions 410" marked as PS indicate that the material of the second protrusions 410" is substantially the same as the material of the PS.

Besides, the second protrusions 410" depicted in FIG. 7(b) are made of substantially the same material as that of the black matrices 410a or the black matrix 410b as depicted in FIG. 5. In FIG. 7(b), the second protrusions 410" marked as BM indicate that the material of the second protrusions 410" is substantially the same as the material of the black matrices 410a or the black matrix 410b.

Alternatively, in FIG. 7(c), some of the second protrusions 410" are made of substantially the same material as that of the black matrices 410a or the black matrix 410b as depicted in FIG. 5, while the other second protrusions 410" are made of substantially the same material as that of the PS. Note that the second protrusions 410" are alternately made of the material of the black matrices and the material of the PS, which should however not be construed as a limitation to this invention.

Figure 8:
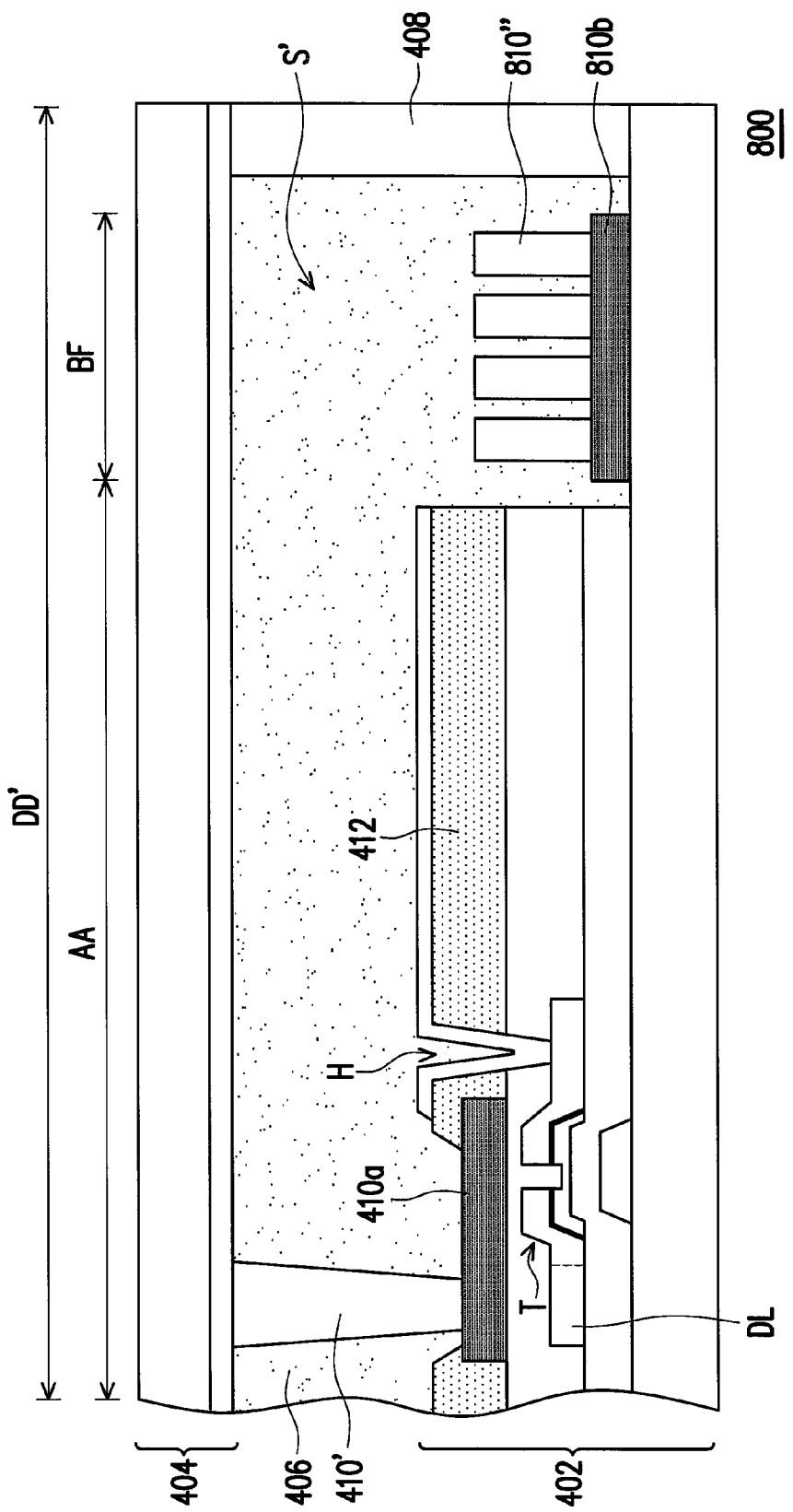
FIG. 8 is a schematic cross-sectional view taken along the cross-section D-D' depicted in FIG. 4 according to another embodiment of the invention.

FIG. 8 is a schematic cross-sectional view taken along the cross-section D-D' depicted in FIG. 4 according to another embodiment of the invention. With reference to FIG. 8, an LCD panel 800 of this embodiment is similar to the LCD panel 500 in the previous embodiment depicted in FIG. 5, while the main difference therebetween lies in that the black matrix 810b of this embodiment is disposed on the active device array substrate 402, and that the second protrusions 810" are located on the black matrix 810b and protrude toward the opposite substrate 404. On the other hand, the black matrices 410a of this embodiment are formed on the active device array, and the black matrices 410a and 810b are located on the same side of the active device array substrate 402.

In other embodiments of the invention, the black matrices 410a can also be formed on the opposite substrate 404. Namely, the black matrices 410a and 810b can be formed on different sides, and the invention poses no limitation to the location of the black matrices 410a.

Figure 9:
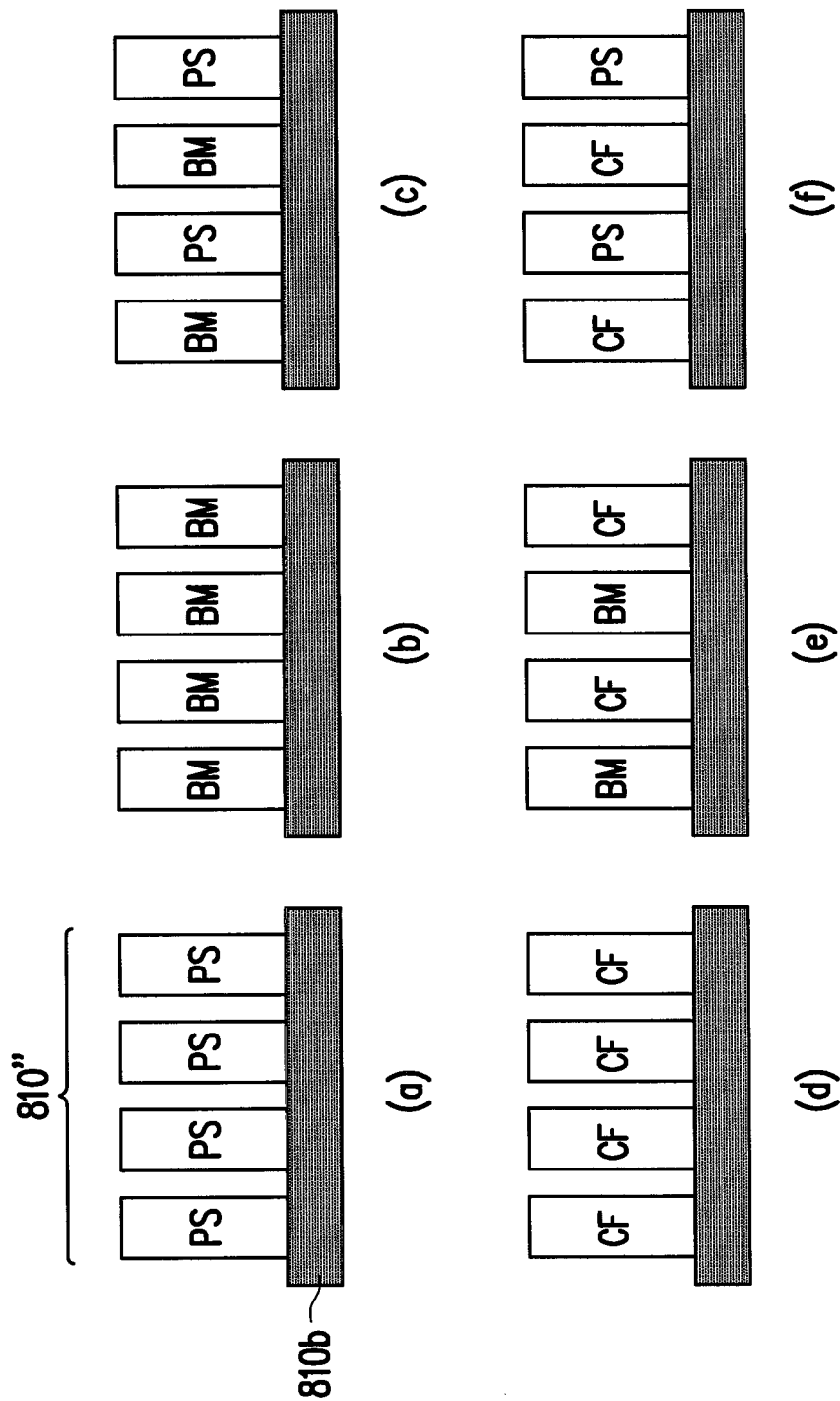
FIG. 9(a)~FIG. 9(f) illustrate the configuration of the black matrix corresponding to the peripheral area depicted in FIG. 8 and the second protrusions made of different materials.

FIG. 9(a)~FIG. 9(f) illustrate the configuration of the black matrix 810b corresponding to the peripheral area depicted in FIG. 8 and the second protrusions 810" made of different materials. Please refer to FIG. 8 and FIG. 9(a)~FIG. 9(f). Similar to FIG. 7(a)~FIG. 7(c), in FIG. 9(a)~FIG. 9(f), the second protrusions 810" are made of the same material as that of the first protrusions 410' depicted in FIG. 8. That is to say, the material of the second protrusions 810" is the same as the material of the PS. Alternatively, the second protrusions 810" can be made of substantially the same material as that of the black matrices 410a or the black matrix 810b as shown in FIG. 8. In FIG. 9(c), some of the second protrusions 810" are made of substantially the same material as that of the black matrix, while the other second protrusions 810" are made of substantially the same material as that of the PS.

In this embodiment, note that the second protrusions 810" can be made of substantially the same material as that of the color filter layer 412, as indicated in FIG. 9(d). In FIG. 9(d), the second protrusions 810" marked as CF indicate that the material of the second protrusions 810" is substantially the same as the material of the color filter layer 412.

Similar to FIG. 9(c), in FIG. 9(e), some of the second protrusions 810" are made of substantially the same material as that of the black matrix, while the other second protrusions 810" are made of substantially the same material as that of the color filter layer. In an alternative, as shown in FIG. 9(f), some of the second protrusions 810" are made of substantially the same material as that of the color filter layer, while the other second protrusions 810" are made of substantially the same material as that of the PS. Similarly, the second protrusions 810" depicted in FIG. 9(e) and FIG. 9(f) are alternately made of different materials, which should however not be construed as a limitation to this invention.

Figure 10:
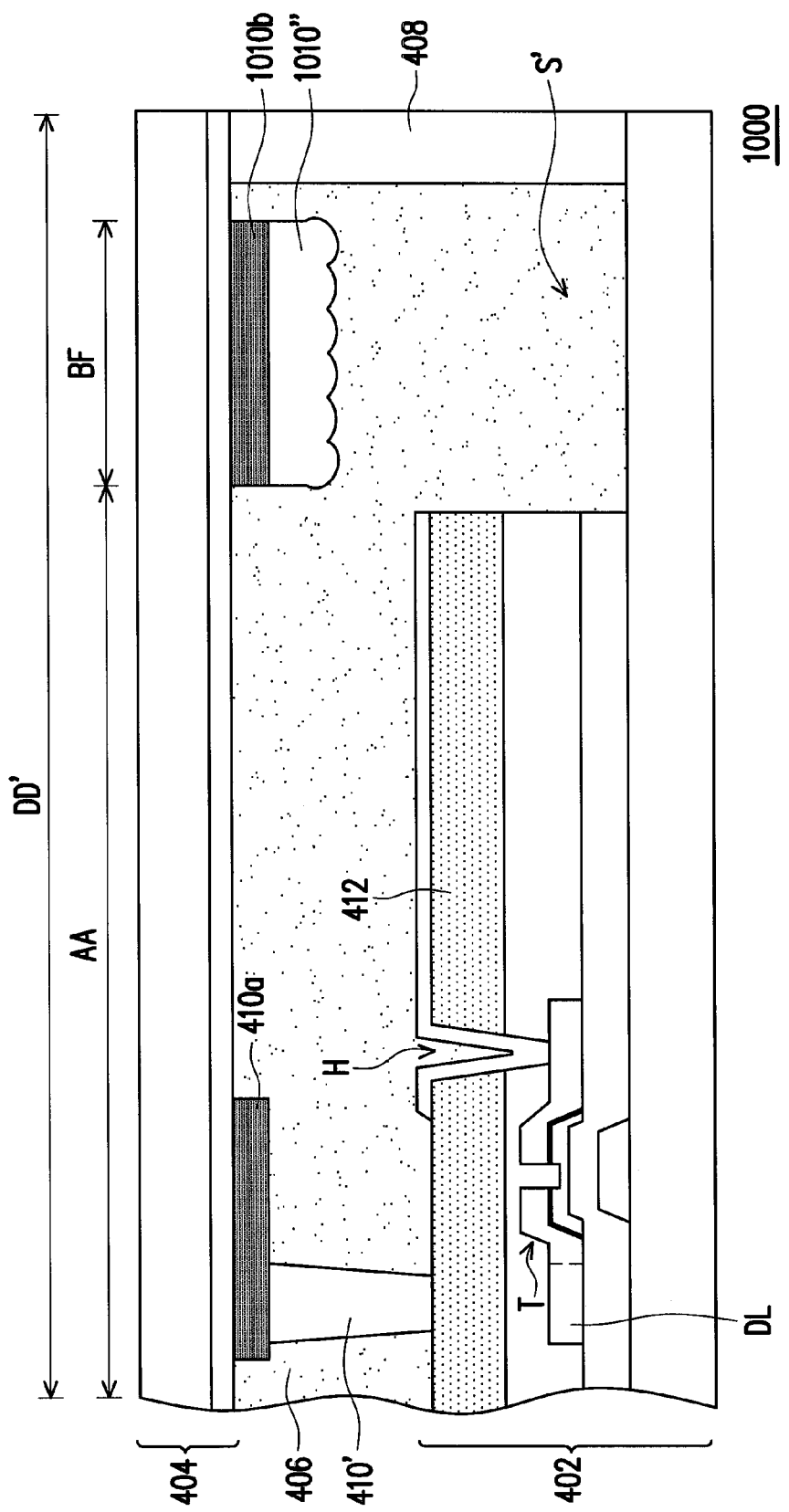
FIG. 10 is a schematic cross-sectional view taken along the cross-section D-D' depicted in FIG. 4 according to another embodiment of the invention.

FIG. 10 is a schematic cross-sectional view taken along the cross-section D-D' depicted in FIG. 4 according to another embodiment of the invention. With reference to FIG. 10, an LCD panel 1000 of this embodiment is similar to the LCD panel 500 of the embodiment depicted in FIG. 5, while the main difference therebetween lies in that the LCD panel 1000 includes rough structures 1010" disposed on a portion of the black matrix.

To be more specific, the black matrices 410a and 1010b of this embodiment are disposed between the active device array substrate 402 and the opposite substrate 404. The black matrices 410a are distributed corresponding to the display area AA, and the black matrix 1010b is distributed corresponding to the peripheral area BF. Note that the rough structures 1010" disposed on the black matrix 1010b are distributed corresponding to the peripheral area BF. Here, surface roughness of the rough structures 1010" is greater than surface roughness of the black matrices 410a distributed corresponding to the display area AA. The black matrix 1010b is disposed on the opposite substrate 404, and the rough structures 1010" protrude toward the active device array substrate 402.

On the other hand, the black matrices 410a of this embodiment are formed on the opposite substrate 404, and the black matrices 410a and 1010b are located on the same side of the opposite substrate 404. In other embodiments of the invention, the black matrices 410a can also be formed on the active device array. Namely, the black matrices 410a and 1010b can be formed on different sides, and the invention poses no limitation to the location of the black matrices 410a.

In this embodiment, the black matrix 1010b disposed corresponding to the peripheral area BF of the LCD panel 1000 includes the rough structures 1010". Hence, when the liquid crystal molecules are diffused to the peripheral area BF, the parameter $dA_{la}$ can alter to a significantly less extent, such that bubbles formed when the liquid crystal layer is formed in the display panel 1000 can be reduced, and the display quality can be improved.

Figure 11:
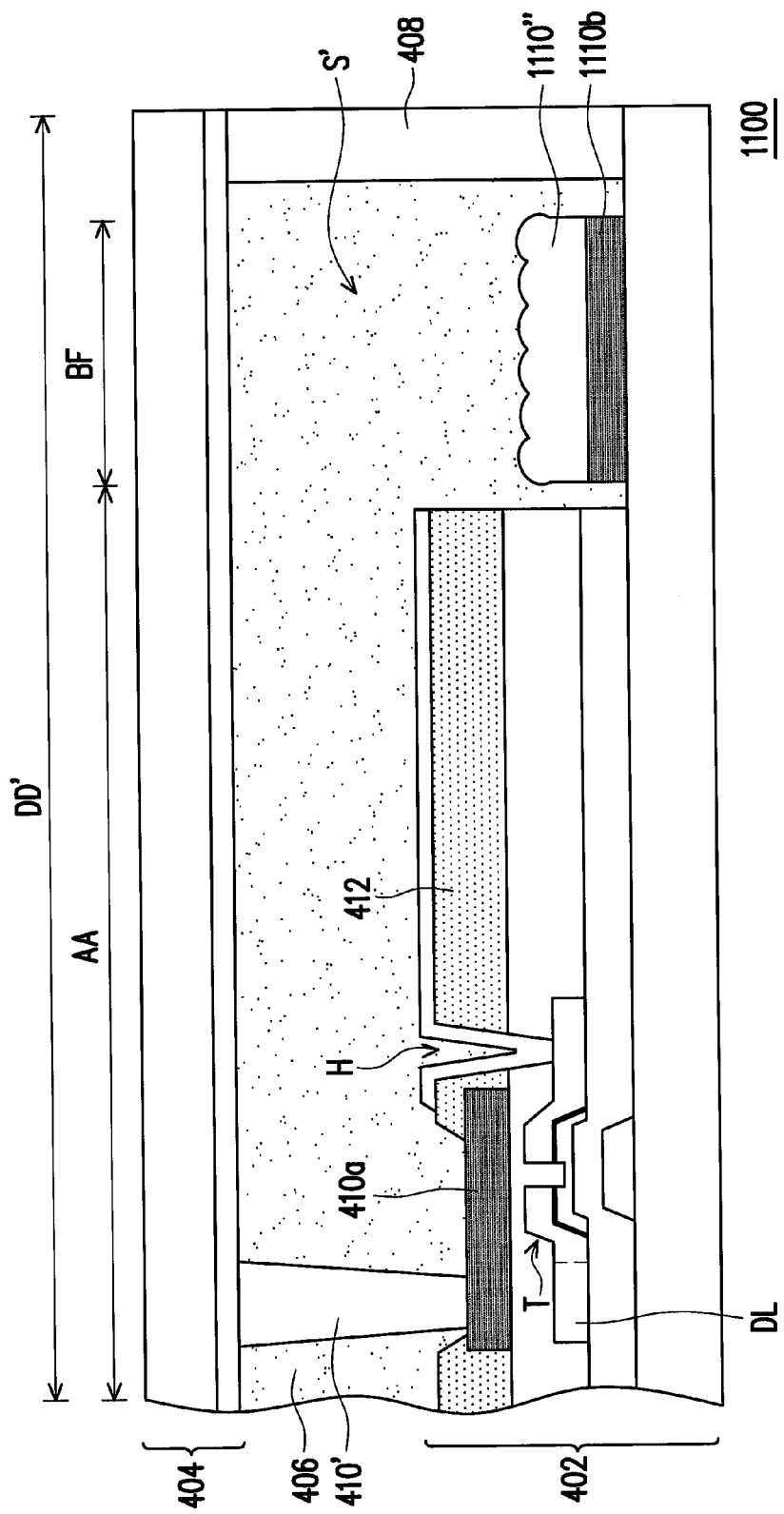
FIG. 11 is a schematic cross-sectional view taken along the cross-section D-D' depicted in FIG. 4 according to another embodiment of the invention.

FIG. 11 is a schematic cross-sectional view taken along the cross-section D-D' depicted in FIG. 4 according to another embodiment of the invention. With reference to FIG. 11, an LCD panel 1100 of this embodiment is similar to the LCD panel 1000 in the previous embodiment depicted in FIG. 10, while the main difference therebetween lies in that the black matrix 1110b and the rough structure 1110" disposed thereon are located on the active device array substrate 402, and that the rough structures 1110" are located on the black matrix 1110b and protrude toward the opposite substrate 404. On the other hand, the black matrices 410a of this embodiment are formed on the active device array, and the black matrices 410a and 1110b are located on the same side of the active device array substrate 402.

In other embodiments of the invention, the black matrices 410a can also be formed on the opposite substrate 404. Namely, the black matrices 410a and 1110b can be formed on different sides, and the invention poses no limitation to the location of the black matrices 410a.

Figure 12:
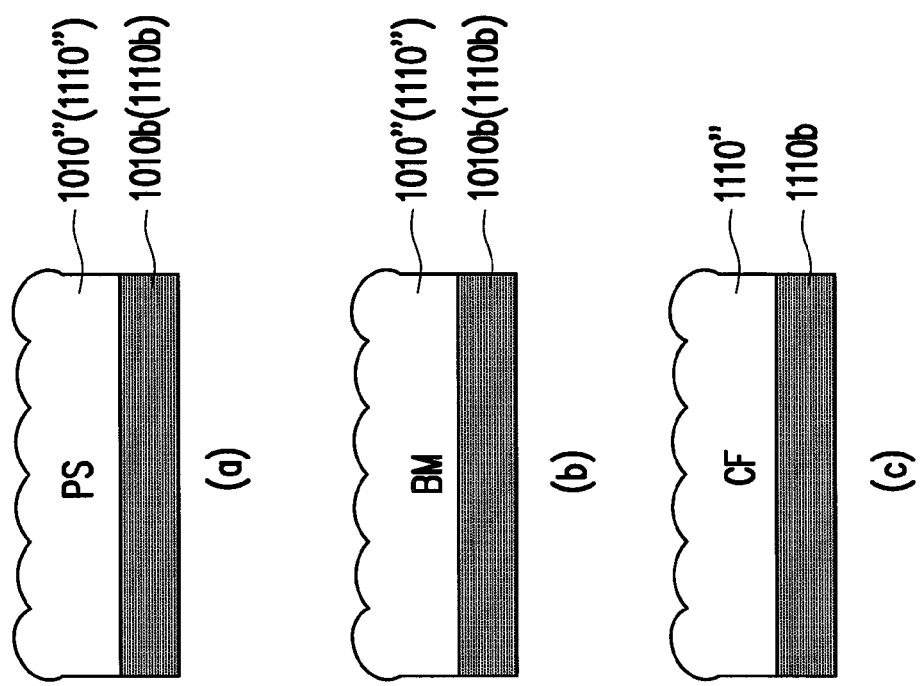
FIG. 12(a)~FIG. 12(c) illustrate the configuration of the black matrix corresponding to the peripheral area depicted in FIG. 10 and FIG. 11 and rough structures made of different materials.

FIG. 12(a)~FIG. 12(c) illustrate the configuration of the black matrix corresponding to the peripheral area depicted in FIG. 10 and FIG. 11 and the rough structures made of different materials. Please refer to FIG. 10 to FIG. 12(a)~FIG. 12(c). In the LCD panel 1000 depicted in FIG. 10, the rough structures 1010" are made of substantially the same material as that of the protrusions 410'. Namely, the rough structures 1010" are made of substantially the same material as that of the PS, as shown in FIG. 12(a). Alternatively, the rough structures 1010" are made of substantially the same material as that of the black matrix, as shown in FIG. 12(b).

In FIG. 12(c), the rough structures 1110" depicted in FIG. 11 not only can be made of substantially the same material as that of the PS or that of the black matrix but also can be made of substantially the same material as that of the color filter layer 412.

In light of the foregoing, the black matrix disposed corresponding to the peripheral area of the LCD panel includes the protrusions or the rough structures according to the embodiments of the invention. Accordingly, when the liquid crystal molecules are diffused, the peripheral area and the liquid crystal layer around the peripheral area can supply an enhanced capillary force, so as to reduce the bubbles generated when the liquid crystal layer is formed in the LCD panel. Moreover, the display quality can be improved as well.

It will be apparent to those skilled in the art that various modifications and variations can be made to the structure of the invention without departing from the scope or spirit of the invention. In view of the foregoing, it is intended that the invention cover modifications and variations of the invention provided they fall within the scope of the following claims and their equivalents.

What is claimed is:

1. A liquid crystal display panel comprising:
    an active device array substrate;
    an opposite substrate disposed above the active device array substrate;

a sealant disposed between the active device array substrate and the opposite substrate, wherein the active device array substrate has a display area and a peripheral area surrounding the display area, and the sealant surrounds the peripheral area;

a liquid crystal layer disposed between the active device array substrate and the opposite substrate and surrounded by the sealant;

a black matrix disposed between the active device array substrate and the opposite substrate and distributed corresponding to the display area and the peripheral area; and a plurality of rough structures disposed on a portion of the black matrix and distributed corresponding to the peripheral area, wherein each of the rough structures is a continuum having a wave-like surface, surface roughness of the rough structures is greater than surface roughness of the black matrix distributed corresponding to the display area, and the liquid crystal layer contacts the rough structures.

2. The liquid crystal display panel as claimed in claim 1 further comprising a plurality of color filter patterns disposed on the active device array substrate.

3. The liquid crystal display panel as claimed in claim 2, wherein the black matrix is disposed on the active device array substrate, and the rough structures protrude toward the opposite substrate.

4. The liquid crystal display panel as claimed in claim 3, wherein a material of the rough structures is substantially the same as a material of the color filter patterns.

5. The liquid crystal display panel as claimed in claim 3, wherein a material of the rough structures is substantially the same as a material of the black matrix.

6. The liquid crystal display panel as claimed in claim 3 further comprising a plurality of protrusions disposed between the active device array substrate and the opposite substrate and distributed corresponding to the display area.

7. The liquid crystal display panel as claimed in claim 6, wherein a material of the rough structures is substantially the same as a material of the protrusions.

8. The liquid crystal display panel as claimed in claim 2, wherein the black matrix is disposed on the opposite substrate, and the rough structures protrude toward the active device array substrate.

9. The liquid crystal display panel as claimed in claim 8, wherein a material of the rough structures is substantially the same as a material of the black matrix.

10. The liquid crystal display panel as claimed in claim 8 further comprising a plurality of protrusions disposed between the active device array substrate and the opposite substrate and distributed corresponding to the display area.

11. The liquid crystal display panel as claimed in claim 10, wherein a material of the rough structures is substantially the same as a material of the protrusions.

* * * * *